US010652509B2

(12) United States Patent
Akiyama

(10) Patent No.: US 10,652,509 B2
(45) Date of Patent: May 12, 2020

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/169,463

(22) Filed: Oct. 24, 2018

(65) Prior Publication Data

US 2019/0124305 A1 Apr. 25, 2019

(30) Foreign Application Priority Data

Oct. 25, 2017 (JP) .................. 2017-206455

(51) Int. Cl.
| | | |
|---|---|---|
| *H04N 9/31* | (2006.01) | |
| *G03B 21/20* | (2006.01) | |
| *G02B 27/48* | (2006.01) | |
| *G02B 27/10* | (2006.01) | |
| *F21V 5/00* | (2018.01) | |
| *G02B 27/14* | (2006.01) | |
| *G02B 27/09* | (2006.01) | |

(52) U.S. Cl.
CPC .......... *H04N 9/3161* (2013.01); *F21V 5/007* (2013.01); *G02B 27/1006* (2013.01); *G02B 27/141* (2013.01); *G02B 27/48* (2013.01); *G03B 21/208* (2013.01); *G03B 21/2033* (2013.01); *H04N 9/3164* (2013.01); *H04N 9/3167* (2013.01); *G02B 27/0961* (2013.01)

(58) Field of Classification Search
CPC .. H04N 9/3161; H04N 9/3164; H04N 9/3167; G03B 21/2033; G03B 21/208; G02B 27/48; G02B 27/141; G02B 27/0961; G02B 27/1006; F21V 5/007
USPC ....................................... 353/52, 53
See application file for complete search history.

(56) References Cited

U.S. PATENT DOCUMENTS

| | | | | |
|---|---|---|---|---|
| 6,594,090 B2* | 7/2003 | Kruschwitz | ........ | G02B 27/0927 345/88 |
| 7,396,130 B2* | 7/2008 | Chen | ...................... | G03B 21/14 348/759 |
| 8,016,428 B2* | 9/2011 | Kasazumi | ............ | G02B 17/004 353/37 |

(Continued)

FOREIGN PATENT DOCUMENTS

WO 2015/056381 A1 4/2015

*Primary Examiner* — Jefferey F Harold
*Assistant Examiner* — Humam M Satti
(74) *Attorney, Agent, or Firm* — Oliff PLC

(57) ABSTRACT

An illuminator includes a light source apparatus including a red solid-state light source unit that emits red light, a green solid-state light source unit that emits green light, and a blue solid-state light source unit that emits blue light, a light combining system that combines the red light, the green light, and the blue light to generate illumination light and emits the illumination light in a first direction, a focusing lens on which the illumination light emitted from the light combining system is incident, a diffuser disposed on the light exiting side of the focusing lens, and an adjustment lens that is located between the green solid-state light source unit and the light combining system and adjusts the position where the green light is focused.

8 Claims, 3 Drawing Sheets

(56) References Cited

U.S. PATENT DOCUMENTS

| | | | |
|---|---|---|---|
| 8,142,031 B2* | 3/2012 | Yonekubo | G03B 21/16 353/94 |
| 2010/0110389 A1* | 5/2010 | Liao | G03B 21/14 353/31 |
| 2016/0198135 A1* | 7/2016 | Kita | G03B 21/2033 348/756 |
| 2018/0259157 A1* | 9/2018 | Nishio | F21V 9/40 |

* cited by examiner

ILLUMINATOR AND PROJECTOR

BACKGROUND

1. Technical Field

The present invention relates to an illuminator and a projector.

2. Related Art

In recent years, a laser light source has received attention as a light source for a projector. In the case where a laser light source is used, speckles could undesirably significantly lower the quality of a displayed image. For example, the light source apparatus disclosed in WO 2015/056381 is so configured that a defocused laser beam is incident on a diffuser so that an enlarged light source image is formed on the diffuser for reduction in the speckles.

It is also conceivable to reduce the size of the light source apparatus described above by use of a focusing lens common to light source units that output RGB laser beams.

In this case, chromatic aberrations of the focusing lens cause the positions where the RGB laser beams are focused to deviate from each other, resulting in different sizes of the light source images formed on the diffuser depending on color. The different sizes of the light source images depending on color results in different speckle reduction effects depending on color, so that the visibilities of the speckles vary depending on color. The speckles cannot therefore be reduced in a well-balanced manner.

The different sizes of the light source images depending on color further results in different thicknesses of the light fluxes (widths of light fluxes) that exit out of the diffuser, undesirably resulting in color unevenness in a displayed image.

SUMMARY

An advantage of some aspects of the invention is to provide an illuminator capable of satisfactorily reducing speckles and color unevenness. Another advantage of some aspects of the invention is to provide a projector including the illuminator.

According to a first aspect of the invention, an illuminator is provided. The illuminator includes a light source apparatus including a red solid-state light source unit that emits red light, a green solid-state light source unit that emits green light, and a blue solid-state light source unit that emits blue light, a light combining system that combines the red light, the green light, and the blue light to generate illumination light and emits the illumination light in a first direction, a focusing lens on which the illumination light emitted from the light combining system is incident, a diffuser located in a light exiting side of the focusing lens, and an adjustment lens that is located between the green solid-state light source unit and the light combining system and adjusts a point where the green light is focused. The focusing lens focuses the red light at a first point and the blue light at a second point which is different from the first point in the first direction, and the diffuser is located between the first point and the second point, and located in a different position from the position where the green light is focused.

The illuminator according to the first aspect causes the color light fluxes (red light, green light, and blue light) to be incident on the diffuser with the focused positions thereof shifted from the diffuser (in what is called defocused states). The size of an illumination region formed on the diffuser by each of the color light fluxes can therefore be increased.

For example, when the illuminator is incorporated in a projector, the spatial uniformity of images formed at the exit pupil of a projection system, which is optically conjugate with the diffuser, is improved. The uniformity of the illuminance distribution at the exit pupil of the projection system is therefore increased, whereby speckle noise is unlikely to be recognized by a viewer. As a result, degradation in the image quality due to the speckles can be reduced.

Further, since the position of the adjustment lens is so adjusted that the illumination regions formed by the color light fluxes have the same size, the uniformity of the illuminance distribution at the exit pupil of the projection system can be roughly fixed irrespective of color. That is, since speckles produced by the color light fluxes can be reduced in a well-balanced manner, the speckle reduction effect is unlikely to vary irrespective of color, whereby the visibilities of the speckles do not vary depending on color. The degradation in image quality due to the speckles can therefore be satisfactorily reduced.

Further, since the illumination regions formed by the color light fluxes have the same size, the color light fluxes diffused when passing through the diffuser have the same thickness (light flux width), whereby color unevenness that occurs in a displayed image can be reduced.

An illuminator that allows satisfactory reduction in speckles and color unevenness can therefore be provided.

In the first aspect described above, it is preferable that the position where the green light is focused by the adjustment lens and the focusing lens coincides with the first point or the second point.

Further, it is desirable that the diffuser is disposed in a position where the red light, the green light, and the blue light projected on the diffuser have the same projection area.

The configuration described above allows the illumination regions formed by the color light fluxes to have the same size, as described above. Speckles and color unevenness can therefore be satisfactorily reduced.

In the first aspect described above, it is preferable that the focusing lens has an Abbe number of 40 or smaller.

The configuration described above increases the amount of chromatic aberrations of the focusing lens, whereby the position where the blue light is focused and the position where the red light is focused can be shifted from each other by a large amount in the optical axis direction, whereby the illumination regions formed on the diffuser can be increased. The amount of speckles can therefore be reduced by a greater amount.

According to a second aspect of the invention, a projector is provided. The projector includes the illuminator according to the first aspect, a light modulator that modulates light from the illuminator in accordance with image information to produce image light, and a projection system that projects the image light.

The projector according to the second aspect includes the illuminator that prevents occurrence of speckles and color unevenness and can therefore display a high-quality image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
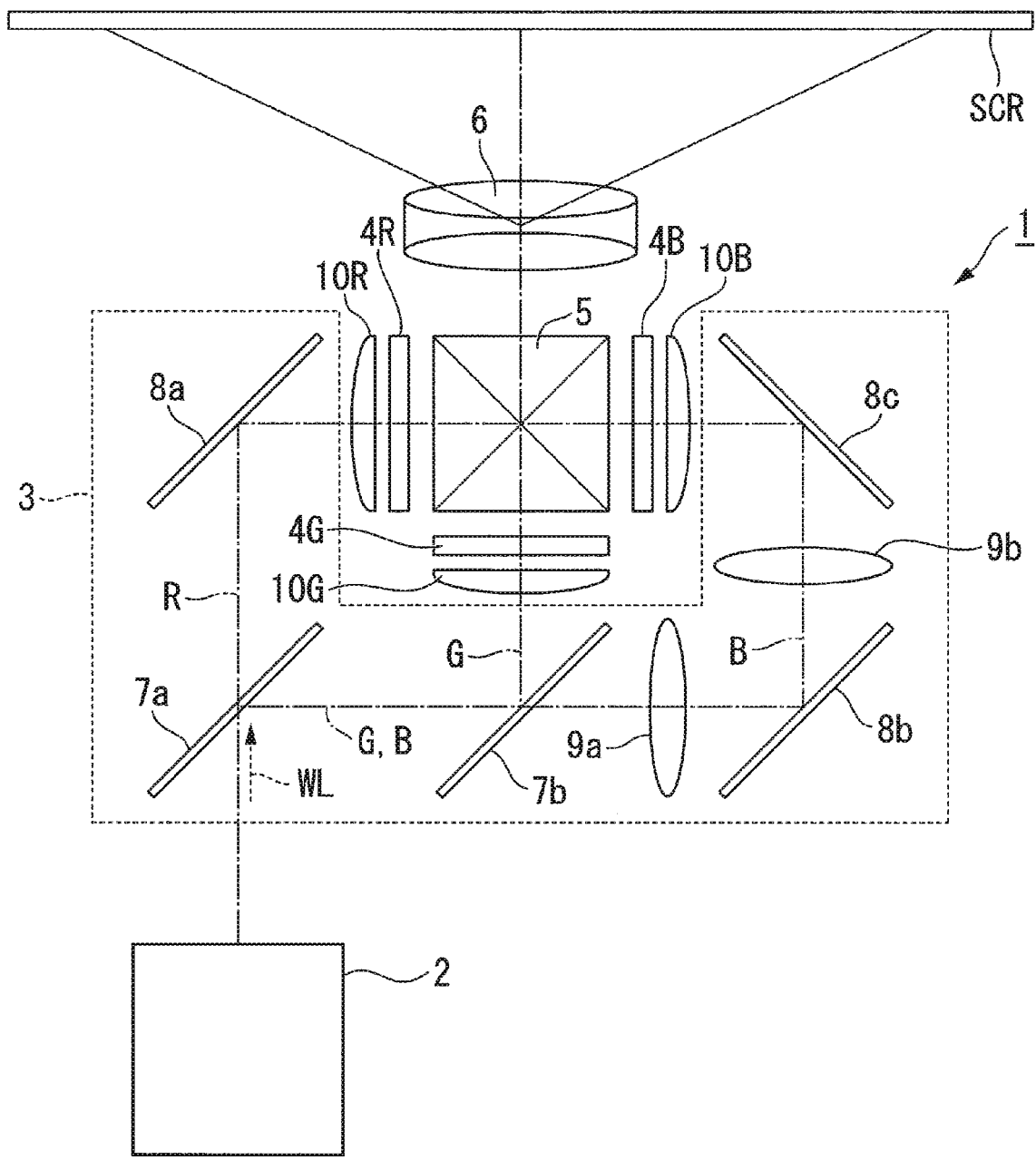
FIG. 1 shows a schematic configuration of a projector according to an embodiment.

An embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

An example of a projector according to the present embodiment will first be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes an illuminator 2, a color separation system 3, a light modulator 4R, a light modulator 4G, a light modulator 4B, a combining system 5, and a projection system 6.

The color separation system 3 separates illumination light WL into red illumination light R, green illumination light G, and blue illumination light B. The color separation system 3 includes dichroic mirrors 7a and 7b, total reflection mirrors 8a, 8b, and 8c, first and second relay lenses 9a, 9b. Red, green, and blue are also hereinafter collectively referred to as RGB in some cases.

The dichroic mirror 7a separate the illumination light WL from the illuminator 2 into the red illumination light R and the other light (green illumination light G and blue illumination light B). The dichroic mirror 7a transmits the red illumination light R and reflects the other light. The dichroic mirror 7b reflects the green illumination light G and transmits the blue illumination light B.

The total reflection mirror 8a reflects the red illumination light R toward the light modulator 4R. The total reflection mirrors 8b and 8c guide the blue illumination light B to the light modulator 4B. The green illumination light G is reflected off the dichroic mirror 7b toward the light modulator 4G.

The first relay lens 9a and the second relay lens 9b are disposed in the optical path of the blue illumination light B and on the downstream side of the dichroic mirror 7b.

The light modulator 4R modulates the red illumination light R in accordance with image information to form red image light. The light modulator 4G modulates the green illumination light G in accordance with image information to form green image light. The light modulator 4B modulates the blue illumination light B in accordance with image information to form blue image light.

The light modulators 4R, 4G, and 4B are each, for example, a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively.

The image light fluxes from the light modulators 4R, 4G, and 4B enter the combining system 5. The combining system 5 combines the image light fluxes with one another and causes the combined image light to exit toward the projection system 6. The combining system 5 is, for example, a cross dichroic prism.

The projection system 6 is formed of a projection lens group, enlarges the combined image light from the combining system 5, and projects the enlarged image light toward the screen SCR. Enlarged color video images are thus displayed on the screen SCR.

Illuminator

Figure 2:
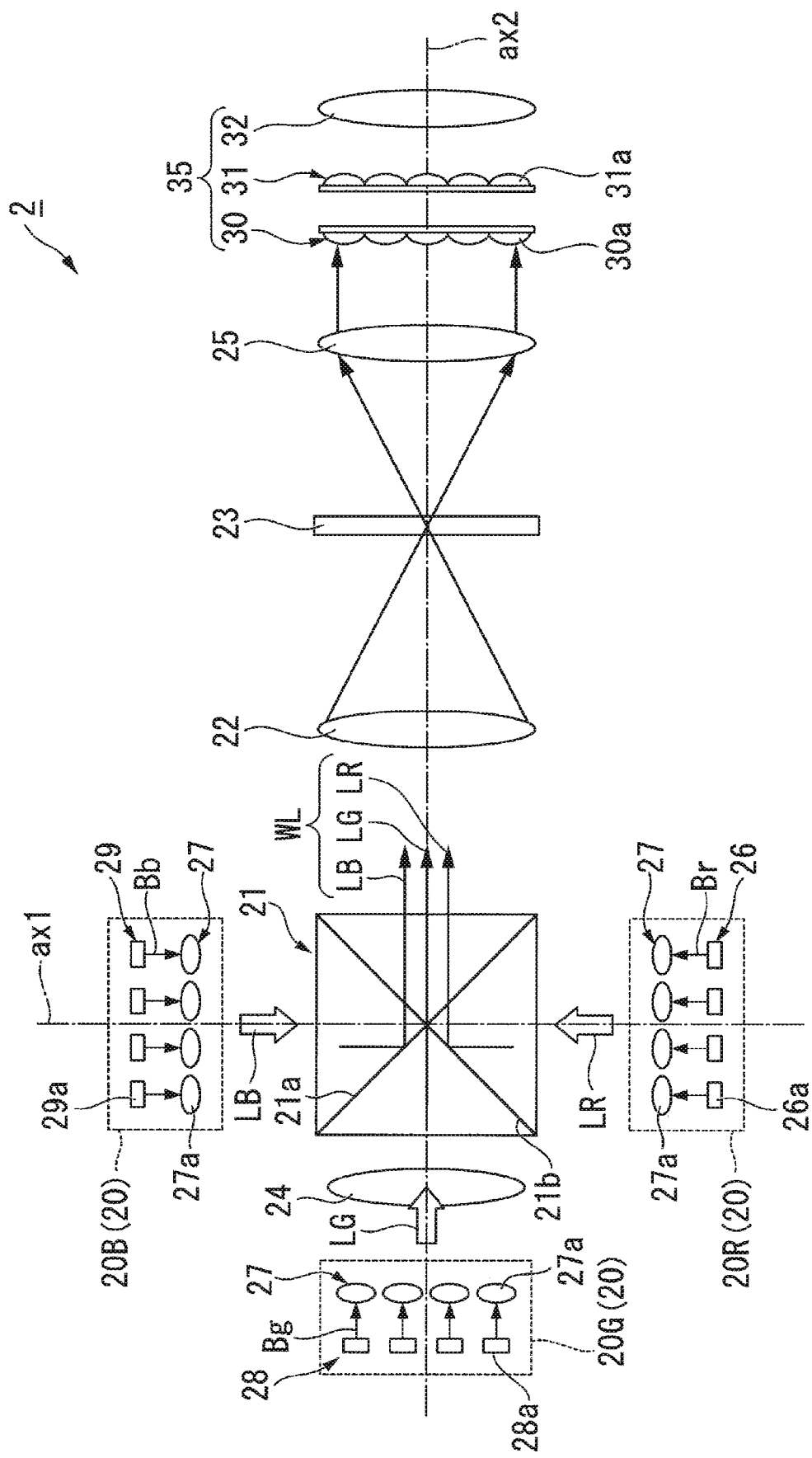
FIG. 2 shows a schematic configuration of an illuminator.

The illuminator 2 according to an embodiment of the invention will subsequently be described. FIG. 2 shows a schematic configuration of the illuminator 2.

The illuminator 2 includes a light source apparatus 20, a light combining system 21, a focusing lens 22, a diffuser 23, an adjustment lens 24, a pickup system 25, and a homogenizing illumination system 35, as shown in FIG. 2.

The light source apparatus 20 includes a red light source section 20R, a green light source section 20G, and a blue light source section 20B.

In the present embodiment, the red light source section 20R, the light combining system 21, and the blue light source section 20B are provided along an optical axis ax1 of the red light source section 20R. The green light source section 20G, the adjustment lens 24, the light combining system 21, the pickup system 25, and the homogenizing illumination system 35 are provided along an illumination optical axis ax2 of the illuminator 2. The optical axis ax1 and the illumination optical axis ax2 are perpendicular to each other. The optical axis of the blue light source section 20B coincides with the optical axis ax1 of the red light source section 20R, and the optical axis of the green light source section 20G coincides with the illumination optical axis ax2.

The red light source section 20R includes a red light source array 26 and a collimation system 27. The red light source array 26 includes a plurality of semiconductor lasers 26a as solid-state light sources. The plurality of semiconductor lasers 26a are arranged in an array in a plane perpendicular to the optical axis ax1. The semiconductor lasers 26a each emit, for example, a red light ray Br (laser beam having a wavelength that belongs to a range, for example, from 585 to 720 nm). That is, the red light source array 26 outputs red light LR formed of a plurality of light rays Br. In the present embodiment, the red light source array 26 corresponds to the "red solid-state light source unit" in the appended claims.

The collimation system 27 converts the light rays Br outputted from the red light source array 26 into a parallelized light ray flux. The collimation system 27 is formed, for example, of a plurality of collimation lenses 27a arranged in an array. The plurality of collimation lenses 27a are disposed in correspondence with the plurality of semiconductor lasers 26a.

Based on the configuration described above, the red light source section 20R outputs the red light LR formed of the parallelized light ray flux toward the light combining system 21.

The green light source section 20G has the same configuration as that of the red light source section 20R except the color of the outputted light. Specifically, the green light source section 20G includes a green light source array 28 and a collimation system 27.

The green light source array 28 includes a plurality of semiconductor lasers 28a. The plurality of semiconductor lasers 28a are arranged in an array in a plane perpendicular to the illumination optical axis ax2. The semiconductor lasers 28a each emit, for example, a green light ray Bg (laser beam having a wavelength that belongs to a range, for example, from 495 to 585 nm). In the present embodiment, the green light source array 28 corresponds to the "green solid-state light source unit" in the appended claims. In the green light source section 20G, the light rays Bg outputted from the green light source array 28 are converted by the collimation system 27 into a parallelized light ray flux.

Based on the configuration described above, the green light source section 20G outputs green light LG formed of the parallelized light ray flux toward the light combining system 21.

The adjustment lens 24 is located between the green light source section 20G and the light combining system 21. The adjustment lens 24 is a lens that adjusts the position where the green light LG is focused. In the present embodiment, the adjustment lens 24 is formed, for example, of a convex lens and adjusts the position where the green light LG is focused in such a way that the focused position moves toward the upstream side (side facing focusing lens 22).

The blue light source section 20B has the same configuration as that of the red light source section 20R except the color of the outputted light. Specifically, the blue light source section 20B includes a blue light source array 29 and a collimation system 27.

The blue light source array 29 includes a plurality of semiconductor lasers 29a. The plurality of semiconductor lasers 29a are arranged in an array in a plane perpendicular to the optical axis ax1. The semiconductor lasers 29a each emit, for example, a blue light ray Bb (laser beam having a wavelength that belongs to a range, for example, from 380 to 495 nm). In the present embodiment, the blue light source array 29 corresponds to the "blue solid-state light source unit" in the appended claims. In the blue light source section 20B, the light rays Bb outputted from the blue light source array are converted by the collimation system 27 into a parallelized light ray flux.

Based on the configuration described above, the blue light source section 20B outputs blue light LB formed of the parallelized light ray flux toward the light combining system 21.

The light combining system 21 causes the white illumination light WL, which is the combination of the RGB color light fluxes (red light LR, green light LG, and blue light LB) outputted from the light source apparatus 20, to exit in one direction and enter the focusing lens 22. The focusing lens focuses the illumination light WL in a predetermined position.

The light combining system 21 is formed of a cross dichroic prism. The light combining system 21 includes a first dichroic mirror 21a and a second dichroic mirror 21b provided between four prisms that form the cross dichroic prism.

The first dichroic mirror 21a and the second dichroic mirror 21b are so disposed as to intersect both the optical axis ax1 and the illumination optical axis ax2 at 45°. Further, the first dichroic mirror 21a and the second dichroic mirror 21b intersect each other at the angle of 45°.

The first dichroic mirror 21a is so optically characterized as to reflect the blue light LB and transmit the green light LG and the red light LR. The second dichroic mirror 21b is so optically characterized as to reflect the red light LR and transmit the blue light LB and the green light LG.

In the present embodiment, the focusing lens 22 causes the illumination light WL to be incident on the diffuser 23 with the illumination light WL focused. The diffuser 23 is disposed on the light exiting side of the focusing lens 22. The diffuser 23 diffuses the illumination light WL to prevent occurrence of speckles, which lower display quality.

The diffuser 23 can, for example, be a known diffuser, for example, a ground glass plate, a holographic diffuser, a transparent substrate having a blasted surface, or a transparent substrate in which beads or any other scatterers are dispersed and the scatterers scatter light.

In the present embodiment, the focusing lens 22 focuses the color light fluxes (red light LR, green light LG, and blue light LB), which form the illumination light WL, in positions different from one another. The deviations among the positions where the red light LR, the green light LG, and the blue light LB are focused result from the chromatic aberrations of the focusing lens 22. That is, it can be said that the focusing lens 22 in the present embodiment is formed of a lens that produces chromatic aberrations.

A typical optical material is characterized in that the refractive index thereof in a short wavelength region is greater than that in a long wavelength region. The focusing lens 22, which is formed of a single lens, therefore focuses short-wavelength light in a position close to the lens and long-wavelength light in a position away from the lens.

Figure 3:
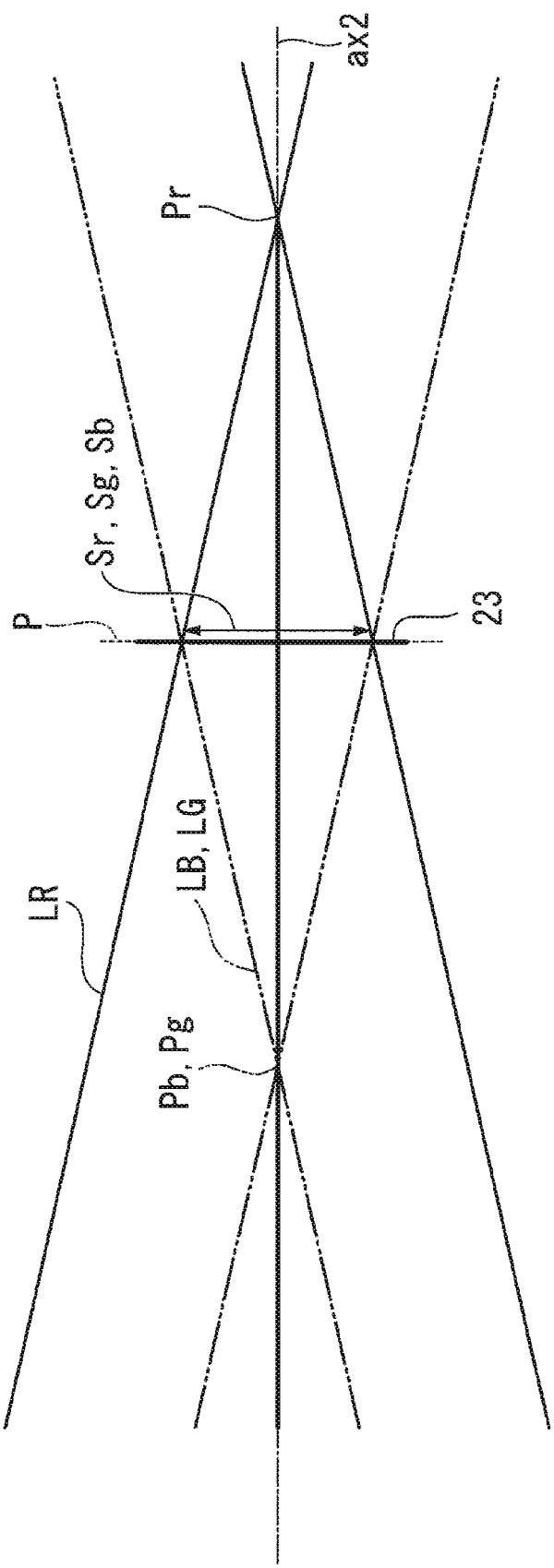
FIG. 3 shows the positional relationship of the positions where color light fluxes are focused with a diffuser.

FIG. 3 shows the positional relationship of the positions where the color light fluxes are focused with the diffuser 23. In FIG. 3, the color light fluxes are drawn in the form of three light rays, and the diffuser 23 is drawn in the form of a line, which means that the thickness of the diffuser 23 is ignored, for ease of illustration. Specifically, the three light rays are formed of a principal ray that passes through the center of the diffuser 23, an upper light ray that specifies the upper side of the width of the light flux, and a lower light ray that specifies the lower side of the width of the color light flux. The principal ray out of the three light rays coincides with the illumination optical axis ax2.

Considering the red light LR and the blue light LB, the red light LR having a long wavelength is focused at a first point farther from the focusing lens 22, and the blue light LB having a short wavelength is focused at a second point closer to the focusing lens 22.

That is, a position Pb where the blue light LB is focused is closer to the focusing lens 22 than a position Pr where the red light LR is focused.

The green light LG belongs to a wavelength band between the wavelength band to which the red light LR belongs and the wavelength band to which the blue light LB belongs. The position where the green light LG is focused is therefore typically located between the position Pr, where the red light LR is focused, and the position Pb, where the blue light LB is focused.

In the present embodiment, the adjustment lens 24, which is formed of a convex lens, adjusts the position Pg, where the green light LG is focused, in such a way that the focused position Pg moves in the optical axis direction toward the upstream side (side closer to focusing lens 22) from the position where the green light LG is focused only by the focusing lens 22. Specifically, in the present embodiment, the position Pg where the green light LG is focused by the adjustment lens 24 and the focusing lens 22 coincides with the position Pb, where the blue light LB is focused, as shown in FIG. 3.

The diffuser 23 is disposed between the position Pr, where the red light LR is focused, and the position Pb, where the blue light LB is focused (position Pg, where the green light LG is focused). That is, the red light LR, the green light LG, and the blue light LB are incident on the diffuser 23 with the focused positions thereof shifted from the diffuser 23 (in what is called defocused states).

In the present embodiment, the diffuser 23 is disposed in a position where the red light LR, the green light LG, and the blue light LB projected on the diffuser 23 have the same area. The projected areas of the red light LR, the green light LG, and the blue light LB correspond to illumination regions where the diffuser 23 is illuminated with the red light LR, the green light LG, and the blue light LB.

In the following description, the illumination light formed by the red light LR on the diffuser 23 is called a red light illumination region Sr, the illumination light formed by the green light LG on the diffuser 23 is called a green light illumination region Sg, and the illumination light formed by the blue light LB on the diffuser 23 is called a blue light illumination region Sb.

In the position where the light rays that form the red light LR (green light LG) and the light rays that form the blue light LB intersect each other (position labeled with reference character P in FIG. 3), the red light illumination region Sr, the green light illumination region Sg, and the blue light illumination region Sb have the same size, as shown in FIG. 3.

That is, the diffuser 23 is disposed in the position where the light rays that form the red light LR and the light rays that form the blue light LB (green light LG) intersect each other.

It is noted that the sizes of the red light illumination region Sr, the green light illumination region Sg, and the blue light illumination region Sb change in accordance with the amount of deviation between the position where the red light LR is focused and the position where the blue light LB (green light LG) is focused.

The amount of deviation between the positions where the red light LR and the blue light LB are focused increases as the amount of chromatic aberrations of the focusing lens 22 increases. The chromatic aberrations of the focusing lens 22 depends on the Abbe number thereof. Specifically, the smaller the Abbe number, the greater the amount of chromatic aberrations. Employing a lens having a small Abbe number as the focusing lens 22 therefore can increase the amount of deviation between the positions where the red light LR and the blue light LB are focused, that is, the size of the red light illumination region Sr, the green light illumination region Sg, and the blue light illumination region Sb.

In the present embodiment, the Abbe number of the focusing lens 22 is set at 40 or smaller.

The amount of deviation between the positions where the red light LR and the blue light LB are focused is thus increased, whereby the areas of the red light illumination region Sr, the green light illumination region Sg, and the blue light illumination region Sb can be increased.

In general, since a lens having a smaller Abbe number is more expensive, employing a lens having a small Abbe number as the focusing lens 22 causes an increase in the cost thereof. Therefore, to maximize the areas of the red light illumination region Sr, the green light illumination region Sg, and the blue light illumination region Sb with an increase in the cost of the focusing lens 22 suppressed, it is preferable to set the Abbe number at a value greater than or equal to 20 but smaller than or equal to 30.

The illumination light WL enters the homogenizing illumination system 35. The homogenizing illumination system 35 includes a first lens array 30, a second lens array 31, and a superimposing lens 32.

The first lens array 30 includes a plurality of first lenslets 30a, which divide the illumination light WL having exited out of the diffuser 23 into a plurality of sub-light ray fluxes.

The plurality of first lenslets 30a are arranged in an array in a plane perpendicular to the illumination optical axis ax2 of the illuminator 2.

The second lens array 31 includes a plurality of second lenslets 31a. The plurality of second lenslets 31a correspond to the plurality of first lenslets 30a. The lens surface of the second lens array 31 (surfaces of second lenslets 31a) is optically conjugate with the diffuser 23.

Images of the red light illumination region Sr, the green light illumination region Sg, and the blue light illumination region Sb are therefore formed on the lens surface of the second lens array 31 (surfaces of second lenslets 31a).

The second lens array 31, along with the superimposing lens 32, superimposes images of the first lenslets 30a of the first lens array 30 on one another in the vicinity of an image formation region of each of the light modulators 4R, 4G, and 4B.

The exit pupil of the projection system 6 is optically conjugate with the light exiting surface of the second lens array 31 (lens surfaces of second lenslets 31a). Images of the red light illumination region Sr, the green light illumination region Sg, and the blue light illumination region Sb are therefore formed at the exit pupil of the projection system 6.

According to the present embodiment, since the positions where the red light LR and the blue light LB are focused are shifted in the optical axis direction based on chromatic aberrations by using the focusing lens 22 having a small Abbe number (smaller than or equal to 40), the red light illumination region Sr, the green light illumination region Sg, and the blue light illumination region Sb formed on the diffuser 23 can be enlarged.

The spatial uniformity of the images formed at the exit pupil of the projection system 6, which is optically conjugate with the diffuser 23, is thus improved. The uniformity of the illuminance distribution at the exit pupil of the projection system 6 is therefore increased, whereby the speckle noise is unlikely to be recognized by a viewer. As a result, degradation in the image quality due to the speckles can be reduced.

In the present embodiment, since the red light illumination region Sr, the green light illumination region Sg, and the blue light illumination region Sb have the same size, the uniformity of the illuminance distribution at the exit pupil of the projection system 6 is roughly fixed irrespective of color.

That is, degradation in the quality of images formed by the blue light LB, the green light LG, and the red light LR, which are each a laser beam, due to speckles can be reduced in a well-balanced manner. The speckle reduction effect is therefore unlikely to vary irrespective of color, whereby the visibilities of the speckles do not vary depending on color.

The illuminator 2 according to the present embodiment therefore allows satisfactory reduction in degradation in the quality of images formed by the blue light LB, the green light LG, and the red light LR, which are each a laser beam, due to speckles.

Further, the illuminator 2 according to the present embodiment allows the red light illumination region Sr, the green light illumination region Sg, and the blue light illumination region Sb to have the same size (light flux diameter). The red light LR, the green light LG, and the blue light LB diffused when passing through the diffuser 23 therefore also have the same thickness (light flux width). The white illumination light WL formed of the red light LR, the green light LG, and the blue light LB having the same thickness therefore allows reduction in color unevenness that occurs in a displayed image.

The projector 1 according to the present embodiment, which includes the illuminator 2 described above, can display a high-quality image with a small amount of decrease in image quality due to speckles and color unevenness.

The invention is not limited to the contents of the embodiment described above, and a variety of changes can be made thereto to the extent that the changes do not depart from the substance of the invention.

For example, in the embodiment described above, the case where the adjustment lens 24 is used to cause the position Pg, where the green light LG is focused, to coincide with the position Pb, where the blue light LB is focused, has been described by way of example. Instead, a configuration in which the position Pg, where the green light LG is focused, is caused to coincide with the position Pr, where the red light LR is focused, may be employed.

In this case, using an adjustment lens 24 formed of a concave lens allows the position Pg, where the green light LG is focused, to be so adjusted that the focused position Pg moves in the optical axis direction toward the downstream side (side farther from focusing lens 22) from the position where the green light LG is focused only by the focusing lens 22.

Further, in the embodiment of the invention, the position Pg, where the green light LG is focused, does not need to completely coincide with the position Pb, where the blue light LB is focused, or the position Pr, where the red light LR is focused. That is, the position Pg, where the green light LG is focused, may not coincide with the focused position Pb or Pr.

In the embodiment described above, as the light combining system 21, which combines the red light LR, the green light LG, and the blue light LB outputted from the light source apparatus 20 with one another, the cross dichroic prism including the first dichroic mirror 21a and the second dichroic mirror 21b is presented by way of example, but the configuration of the light combining system 21 is not limited thereto.

For example, after a dichroic mirror may be used to combine the red light LR and the blue light LB with each other to produce yellow light, another dichroic mirror may be used to combine the green light LG with the yellow light to produce the white illumination light WL.

In the embodiment described above, the case where the white illumination light WL, which is the combination of the RGB color light fluxes outputted from the light source apparatus 20, enters the focusing lens 22 has been presented by way of example, but not necessarily in the invention.

For example, illumination light that can be taken as white light when viewed as the entire light flux may be caused to enter the focusing lens 22. The light that can be taken as white light when viewed as the entire light flux refers to light that does not achieve the color of white as a mixture of a plurality of RGB light rays but light that achieves the color of white as the entire light flux including a plurality of light rays. The light that achieves the color of white as the entire light flux is produced, for example, by a light source apparatus in which the semiconductor lasers 26a, 28a, and 29a, which emit RGB color light beams, respectively, are mounted on the same substrate.

In the embodiment described above, the projector 1 including the three light modulator 4R, 4G, and 4B is presented by way of example. The invention is also applicable to a projector that uses a single light modulator to display color video images. Further, a digital micromirror device may be used as each of the light modulators.

Further, the above embodiment has been described with reference to the case where the illuminator according to the embodiment of the invention is incorporated in a projector, but not necessarily. The illuminator according to the embodiment of the invention may be used as a lighting apparatus, a headlight of an automobile, and other components.

The entire disclosure of Japanese Patent Application No. 2017-206455, filed on Oct. 25, 2017 is expressly incorporated by reference herein.

What is claimed is:

1. An illuminator comprising:
a light source apparatus including a red solid-state light source unit configured to emit red light, a green solid-state light source unit configured to emit green light, and a blue solid-state light source unit configured to emit blue light;
a light combining system configured to combine the red light, the green light, and the blue light to generate illumination light and emit the illumination light in a first direction;
an adjustment lens that is located between the green solid-state light source unit and the light combining system and configured to adjust a point where the green light is focused;
a focusing lens on which the illumination light emitted from the light combining system is incident, the focusing lens being configured to focus the red light at a first point and the blue light at a second point which is different from the first point in the first direction;
a diffuser located in a light exiting side of the focusing lens, the diffuser being located between the first point and the second point, and located in a different position from the position where the green light is focused.

2. The illuminator according to claim 1,
wherein the position where the green light is focused by the adjustment lens and the focusing lens coincides with the first point or the second point.

3. The illuminator according to claim 2,
wherein the diffuser is disposed in a position where the red light, the green light, and the blue light projected on the diffuser have the same projection area.

4. A projector comprising:
the illuminator according to claim 3;
a light modulator that modulates light from the illuminator in accordance with image information to produce image light; and
a projection system that projects the image light.

5. A projector comprising:
the illuminator according to claim 2;
a light modulator that modulates light from the illuminator in accordance with image information to produce image light; and
a projection system that projects the image light.

6. The illuminator according to claim 1,
wherein the focusing lens has an Abbe number of 40 or smaller.

7. A projector comprising:
the illuminator according to claim 6;
a light modulator that modulates light from the illuminator in accordance with image information to generate image light; and
a projection system that projects the image light.

8. A projector comprising:
the illuminator according to claim 1;

a light modulator that modulates light from the illuminator in accordance with image information to produce image light; and
a projection system that projects the image light.

\* \* \* \* \*